US007878550B2

(12) United States Patent
Patel et al.

(10) Patent No.: US 7,878,550 B2
(45) Date of Patent: Feb. 1, 2011

(54) APPARATUS, SYSTEM, AND METHOD FOR JOINING AND SEALING CONDUITS

(75) Inventors: Jayant D. Patel, Lake Forest, CA (US); Alfred R. Wiratunga, Northridge, CA (US); Clifford J. Petersen, Irvine, CA (US)

(73) Assignee: The Boeing Company, Chicago, IL (US)

( * ) Notice: Subject to any disclaimer, the term of this patent is extended or adjusted under 35 U.S.C. 154(b) by 980 days.

(21) Appl. No.: 11/428,091

(22) Filed: Jun. 30, 2006

(65) Prior Publication Data

US 2008/0001406 A1 Jan. 3, 2008

(51) Int. Cl.
*F16L 21/00* (2006.01)
(52) U.S. Cl. ............... 285/235; 285/21.2; 285/115; 285/223; 285/236; 138/109
(58) Field of Classification Search ......... 285/114–115, 285/222.1–222.5, 223, 235–237, 21.1–21.2; 138/109–110, 119, 126, 132
See application file for complete search history.

(56) References Cited

U.S. PATENT DOCUMENTS

| | | | | |
|---|---|---|---|---|
| 2,261,948 A | * | 11/1941 | Beach | 181/233 |
| 3,462,177 A | * | 8/1969 | Skinner et al. | 285/222.2 |
| 3,938,834 A | * | 2/1976 | Oostenbrink | 285/235 |
| 4,768,563 A | | 9/1988 | Kogge et al. | |
| 6,811,192 B2 | | 11/2004 | Patel et al. | |
| 2004/0075277 A1 | * | 4/2004 | Patel et al. | 285/369 |
| 2004/0089401 A1 | * | 5/2004 | Patel et al. | 156/152 |

FOREIGN PATENT DOCUMENTS

EP 1 589 270 A1 10/2005

OTHER PUBLICATIONS

International Search Report and Written Opinion for International Appl. No. PCT/US2007/012391, mailed Dec. 13, 2007.

* cited by examiner

*Primary Examiner*—Aaron Dunwoody
*Assistant Examiner*—Fannie Kee
(74) *Attorney, Agent, or Firm*—Alston & Bird LLP (57) ABSTRACT

An apparatus and a system for joining and sealing conduits are provided. The apparatus includes an edge trim positioned proximate to an end of a first conduit, and a sleeve positioned between the first conduit and a second conduit. The sleeve includes a flexible end positioned adjacent to the edge trim such that a portion of the flexible end of the sleeve overlies at least a portion of the edge trim, a semi-rigid end opposite the flexible end and positioned over at least a portion of the second conduit, and a flexible medial portion extending between the flexible end and the semi-rigid end. The apparatus also includes a retaining element configured to be secured over the flexible end of the sleeve such that a portion of the flexible end of the sleeve is sandwiched between the retaining element and the edge trim.

24 Claims, 6 Drawing Sheets

APPARATUS, SYSTEM, AND METHOD FOR JOINING AND SEALING CONDUITS

BACKGROUND OF THE INVENTION

1) Field of the Invention

Embodiments of the present invention relate to joining and sealing conduits and, in particular, to joining and sealing conduits of various shapes and with variable gap conditions and alignments and in areas with a lack of accessibility and visibility.

2) Description of Related Art

Conduits, such as ducts, hoses, pipes, tubes, and the like are frequently used to transport various fluids or other elements within a structure, such as a vehicle, aircraft, or building. Many times the conduits are installed after the structure is partially or totally built, and the conduits must be installed in pieces. The pieces of the conduits then must be joined and sealed after installation.

For example, in the aircraft industry, the environmental control system includes ducts to carry liquids, gases, and the like required to regulate the environment of the aircraft, such as between an air duct distribution and a mix-chamber connecting system. Typically, the environmental control system ducts are designed and installed after the aircraft is partially or totally built, such that the duct shape must conform to the available space, and the ducts must be installed in pieces to avoid structural interferences. As the ducts are installed, nominal one to three inch gaps are generally maintained between the duct segments depending upon the length and material of the duct in order to allow for expansion during operation and to accommodate movements and absorb shocks. Thus, the ducts may be round, elliptical, square, or any other shape that fits in the available space, and the segments of the duct must be joined and sealed in the already congested areas of the aircraft where there is little room to access or view the entire duct joint area.

The conventional manner of joining environmental control system ducts includes bonding elastomeric sheeting, such as flat sheets of silicone impregnated glass, around adjacent portions of the connecting ducts with adhesive, such as Room Temperature Vulcanized (RTV) adhesive. The adhesive must be applied at several locations on the duct system, which is difficult because of the limited space and lack of visibility around the duct, the time-sensitive nature of completing the adhesive bond, and the uniqueness of the design of the ducts.

The process of bonding the elastomeric sheeting to join the ducts requires surface preparation, cleaning, multiple supplies, and tools. In addition to the supplies and tools used to apply the sheeting to the ducts, an x-ray machine is also typically used to determine the integrity of the bond between the sheeting and the duct. The x-ray photographs of the joint area reveal where there are voids in the adhesive, uneven application of adhesive, substrate mating pressure, or other issues with the adhesive that may affect the bond between the sheeting and the duct. If the x-rays reveal a problem with the bond, then the installer must remove the sheeting and the adhesive, reapply the adhesive and sheeting, and again x-ray the joint to determine the integrity of the bond. This process must be repeated until the bond between the sheeting and the duct is acceptable and free of voids.

Once the bond between the sheeting and the duct is acceptable, the elastomeric sheeting is then clamped to the ducts with metal band clamps or tie wraps. The clamps, however, do not provide uniform circumferential pressure to the sheeting covered duct joints, particularly not to the ducts that are square or have some other non-round shape. Thus, when a duct experiences deflection due to internal pressure, the clamp may cause the duct surface to concave, which creates a gap and causes leakage of the elements within the duct. Deflection of the duct also may cause the duct to change shape, which may result in the loosening of the grip of the clamps, a break in the adhesive, and leakage of the elements contained in the ducts. Furthermore, even if the clamps remain tightly in place on the sheeting and ducts, the sharp edges of the clamp may cut into the elastomeric sheeting, particularly as the ducts are subjected to the vibrations, shocks and pressures associated with the operation of an aircraft. Once the clamp cuts into the sheeting, the sheeting will tear and, again, cause leakage of the elements contained in the ducts.

The leaking of the elements contained in the ducts is particularly severe in aircraft that are operated in high humidity or tropical climates because the environmental control system ducts contain high levels of moisture condensation. If the ducts are not completely joined and sealed, the fluid may leak onto electrical systems housed below the ducts and through overhead ceiling panels into the passenger area or body of the aircraft. Due to repeated airline customer requests for assistance on water penetrating and damaging electrical components, a temporary cradle made of a flat sheet of silicone impregnated glass may be hung under the joining system to hold water for preventing shorting of the underlying electrical systems and resultant malfunctions with the eventual release of water on the passengers. In addition, the moisture release may require a pilot to initiate emergency landing procedures, which includes dumping fuel for a premature landing at the nearest airport.

In order to repair the leaking duct joints, the clamp may be removed and wider sheeting applied to attempt to seal the joint. Typically, however, the ducts, clamps, and sheeting must be removed and the adhesive must be cleaned off of the ducts, which is difficult, time-consuming, and prone to damage the ducts. New adhesive, sheeting, and clamps then must be re-applied to the ducts, which is another labor-intensive and time-consuming procedure that is not guaranteed to remedy the problem. In addition, during certain mandatory aircraft maintenance and structural checks, the entire environmental control duct system must be removed and re-installed. After repeated repairs and re-installations, the entire environmental control duct system must be replaced because of the wear and tear on the joint bonding surfaces of the ducts. Therefore, in addition to the time and expense involved in the initial joining and sealing of the ducts, the repairs, re-installation and ultimate replacement is extremely costly because of the human labor and time involved, the loss of flight time for the aircraft, and the cost of replacing the parts of the duct system that cannot be reused after removal.

Thus, there exists a need in the industry for an efficient manner in which to join and seal conduits that have inherent system issues. In particular, there exists a need for an efficient way to join and completely seal conduits of various shapes such that the deflection of the conduit under internal pressure will not cause leakage from the joints, and the joints will not have to be repaired or replaced frequently. Additionally, it would be desirable if the joints may be removed for thorough maintenance checks and reinstalled without an excessive investment of human labor and time, without significant loss of flight time for the aircraft, and without having to replace part or all of the conduit system.

BRIEF SUMMARY OF THE INVENTION

Embodiments of the invention address the above needs and achieve other advantages by providing an apparatus, system, and method for joining and sealing conduits. According to one embodiment, a conduit and an air mixing plenum are joined such that the conduit and air mixing plenum are in fluid communication with one another. Embodiments of the present invention generally employ a sleeve having flexible and semi-rigid ends, where the semi-rigid end is positioned over the end of the air mixing plenum in a snap fit. The flexible end of the sleeve is capable of mechanically engaging the conduit. Thus, neither the semi-rigid end nor the flexible end requires bonding to the air mixing plenum and conduit, respectively. Moreover, the sleeve is capable of engaging conduits having various cross sections (e.g., non-round) and having variable gap conditions and alignments therebetween.

In one embodiment of the present invention, an apparatus for joining and sealing conduits is provided. The apparatus includes an edge trim positioned proximate to an end of a first conduit, and a sleeve positioned between the first conduit and a second conduit. The sleeve includes a flexible end positioned adjacent to the edge trim such that a portion of the flexible end of the sleeve overlies at least a portion of the edge trim, a semi-rigid end opposite the flexible end and positioned over at least a portion of the second conduit, and a flexible medial portion extending between the flexible end and the semi-rigid end. The semi-rigid end is less flexible than the flexible end of the sleeve. The apparatus also includes a retaining element configured to be secured over the flexible end of the sleeve such that a portion of flexible end of the sleeve is sandwiched between the retaining element and the edge trim.

According to aspects of the apparatus, the apparatus also includes a layer of elastomeric material bonded proximate to the semi-rigid end of the sleeve. The layer of elastomeric material may include an inwardly extending ridge that is configured to conform to a bead extending outwardly from the second conduit. The retaining element could include an inwardly extending ridge and the edge trim an outwardly extending bead such that at least a portion of the flexible end of the sleeve is configured to be sandwiched between the bead and the inwardly extending ridge. Moreover, the apparatus could include at least one helix positioned along the medial portion of the sleeve. The semi-rigid end of the sleeve may include a plurality of layers of semi-rigid material, wherein each of the layers of semi-rigid material is a different length. The semi-rigid end of the sleeve may be configured in a dog-bone shape.

Additional aspects of the apparatus include an insert positioned adjacent to the edge trim and adjacent to, and at least partially within, the end of the first conduit. At least a portion of an inner surface of the edge trim may include a plurality of serrations, wherein the serrations are configured to engage serrations extending outwardly from an outer surface of the insert. Similarly, at least a portion of an outer surface of the insert could include a plurality of serrations, wherein the serrations are configured to engage serrations extending outwardly from an inner surface of the first conduit. Furthermore, the edge trim may include a lip positioned adjacent to an end of the insert. At least a portion of the insert positioned adjacent to the first conduit may be an elastomeric material. In addition, the edge trim may be positioned adjacent to at least a portion of the end of the first conduit, wherein at least a portion of the edge trim comprises an elastomeric material.

An additional embodiment of the present invention provides a system for joining and sealing a conduit and an air mixing plenum. The system includes a conduit and an air mixing plenum spaced away from the conduit to define a gap therebetween. The system further includes a sleeve positioned within the gap between the conduit and the air mixing plenum and including a flexible end and a semi-rigid end opposite the flexible end. The semi-rigid end is less flexible than the flexible end of the sleeve. The flexible end is positioned over at least a portion of the conduit, and the semi-rigid end is positioned over at least a portion of the air mixing plenum such that the conduit and air mixing plenum are in fluid communication with one another. According to variations of the system, the system may include an edge trim positioned proximate to an end of the conduit, a retaining element configured to be secured over the flexible end of the sleeve such that a portion of the flexible end of the sleeve is sandwiched between the retaining element and the edge trim, and/or an insert positioned adjacent to the edge trim and adjacent to, and at least partially within, the end of the conduit.

A further modification of one embodiment of the present invention provides a method for joining and sealing conduits. The method includes mounting an edge trim proximate to an end of a first conduit and extending a sleeve between the first conduit and a second conduit. The method also includes positioning a flexible end of the sleeve adjacent to the edge trim such that a portion of the flexible end of the sleeve overlies at least a portion of the edge trim and positioning a semi-rigid opposite end of the sleeve over at least a portion of the second conduit. The semi-rigid end is less flexible than the flexible end of the sleeve. In addition, the method includes securing a retaining element over the flexible end of the sleeve such that a portion of the flexible end of the sleeve is sandwiched between the retaining element and the edge trim.

Additional aspects of the method include mounting an insert adjacent to the edge trim and adjacent to, and at least partially within, the end of the first conduit. The positioning step could include positioning the flexible end of the sleeve over a bead extending outwardly from the edge trim, and/or the securing step could include securing the retaining element over at least a portion of the flexible end of the sleeve and the bead extending outwardly from the edge trim. Moreover, the positioning step may include positioning the semi-rigid end of the sleeve over a bead extending outwardly from the second conduit, and/or the positioning step may include positioning the semi-rigid end of the sleeve over at least a portion of an air-mixing plenum.

An additional embodiment of the present invention provides a sleeve for joining and sealing conduits. The sleeve includes a core layer (e.g., an elastomeric or a foam material) having an inner surface and an outer surface, and a first layer and a second layer of facing (e.g., an elastomeric material coated on a layer of fabric) bonded to at least a portion of respective inner and outer surfaces of the core layer. The sleeve also includes at least one layer of semi-rigid material (e.g., a pre-impregnated composite material) positioned between the first and second layers of facing and proximate to a first end of the sleeve such that the portion of the sleeve comprising the semi-rigid material is less flexible than the remaining portion of the sleeve.

Various optional features of the sleeve include a layer of elastomeric material bonded to the first layer of facing along the portion of the sleeve comprising the layer of semi-rigid material. The layer of elastomeric material may include an inwardly extending ridge, wherein the ridge is configured to conform to a bead extending outwardly from an air mixing plenum. The sleeve may also include at least one helix positioned along a medial portion of the sleeve such that the helix does not overlie the portion of the sleeve comprising the layers of semi-rigid material. Each helix may be positioned adjacent to or within the first layer of facing, the second layer of facing, and/or the core layer. The sleeve may include a plurality of layers of semi-rigid material positioned between the first and second layers of facing, wherein each of the layers of semi-rigid material is a different length. The at least one layer of semi-rigid material may be embedded within or positioned adjacent to the core layer and/or include a rounded end that is capable of pivoting within at least one of the first and second layers of facing and the core layer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
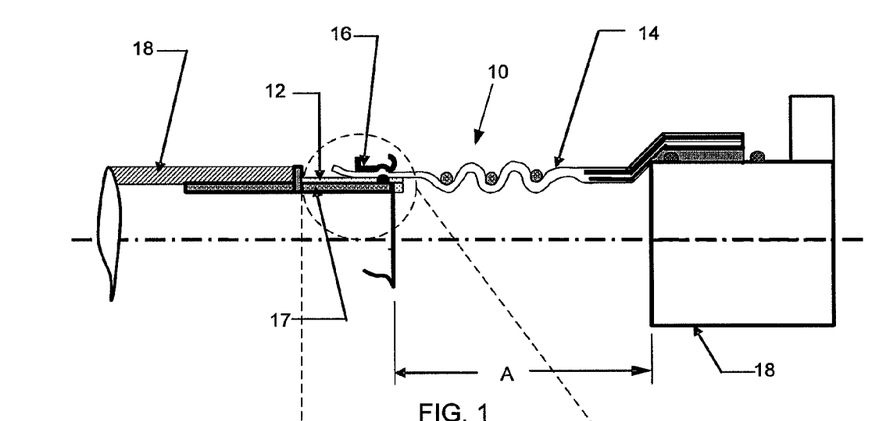
FIG. 1 is a cross-sectional view of a system for joining and sealing conduits according to one embodiment of the present invention.

Referring now to the drawings and, in particular to FIG. 1, there is shown one embodiment of an apparatus 10 for joining and sealing conduits. In the illustrated embodiment, the apparatus 10 for joining and sealing conduits includes an edge trim 12, a sleeve 14, a retaining element 16, and an insert 17 to join the conduits 18. As shown in FIG. 1, the sleeve 14 extends between a duct and an air mixing plenum.

As used herein, the term "conduit" is not meant to be limiting, as the conduit 18 may be any duct, hose, pipe, tube or the like used to transport or distribute various liquids, gases, or other elements within a structure, such as a vehicle, an aircraft, or a building. For example, in an aircraft, an environmental control system includes ducts to carry fluids to regulate the environment of the aircraft, such as between an air duct distribution and a mix-chamber connecting system. In addition, the conduit may have various cross-sections, such as round, elliptical, or rectangular. Furthermore, although reference is made herein to an aircraft, embodiments of the present invention may be utilized in other structures where the transport of fluids between conduits is required, such as in a building.

Figure 4:
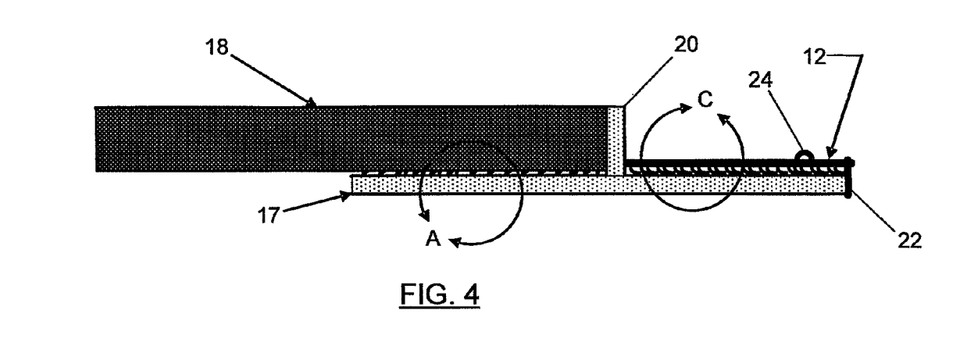
FIG. 4 is a cross-sectional view of a conduit, an edge trim, and an insert according to a particular embodiment of the present invention.

The insert 17 extends adjacent to an inner surface of the conduit 18, about the end of the conduit, and adjacent to the edge trim 12. The insert 17 is typically a rigid material, such as a resin pre-impregnated fabric. The insert 17 could be any desired length to facilitate sufficient contact with the conduit 18 and edge trim 12. When the conduit 18 is trimmed to maintain a constant gap due to gap variability in aircraft, the honeycomb cell structure of the conduit will be exposed, which may lead to moisture absorption and structural damage to the conduit. The insert 17 also prevents the elements carried by the conduit 18 from penetrating into the end of the conduit 18 and prevents delamination of a composite conduit. Thus, as shown in FIG. 4, the insert 17 includes a laterally or radially extending wall 20 that abuts the exposed edge of the conduit 18 to seal the honeycomb end. The wall 20 could be an elastomeric material to provide a tight seal due to the penetration of the material into the honeycomb interstices. In addition, the elastomeric properties of the insert 17 may provide adequate friction to fixedly engage and seal about the end of a conduit 18.

Figure 1A:
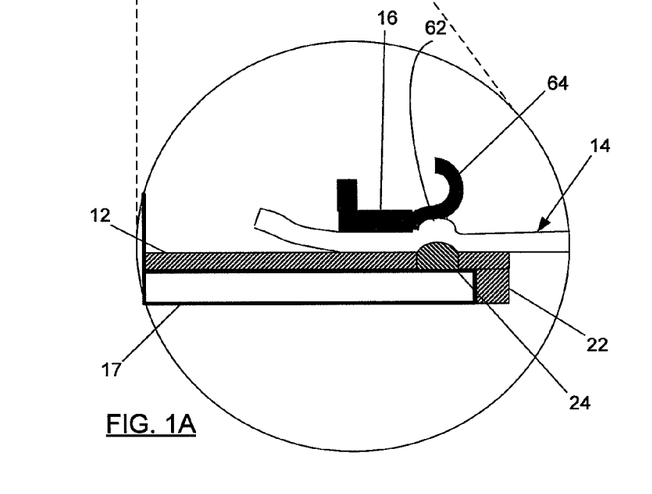
FIG. 1A is an enlarged cross-sectional view of the system shown in FIG. 1 illustrating the retaining element engaged with the edge trim, sleeve, and insert.

The edge trim 12 extends adjacent to an outer surface of the insert 17, as shown in FIGS. 1 and 1A. The edge trim 12 also includes a lip 22 that extends about the end of the insert. The lip 22 could also extend further to cover part of the inner surface of the insert 17. By at least partially extending along the surface of the insert 17 proximate the end of the conduit 18, the edge trim 12 provides a smooth surface to support and engage the sleeve 14 and seal the joint. Thus, the edge trim 12 and insert 17 hide any imperfections in the end of the conduit 18 that could cause interference in the seal with the sleeve 14, such as imperfections associated with the material type, termination of composite material plies, weldment of metals, kinking in the conduit, and the like. Generally, the edge trim 12 is molded to custom fit the shape of the end of the conduit to be joined and sealed, but standard size edge trim may be made for standard conduit shapes and sizes.

The edge trim 12 also may include a bead 24 extending outwardly from the outer surface of the edge trim, near the end of the conduit 18. The bead 24 is shown on the edge trim in FIGS. 1 and 4. The bead 24 may extend partially or totally about the circumference of the edge trim 12. The bead 24 may be various sizes and shapes depending upon the application, but generally has a semicircular or other rounded shape with a height typically less than the thickness of the sleeve 14.

The edge trim 12 may be made of any appropriate material. To create the tightest seal between the edge trim 12 and the insert 17, however, the edge trim 12 may be made of any semi-compressible, damage tolerant and flexible material, such as an elastomeric material. The elastomeric material may be silicone or an elastomeric-coated fiberglass fabric. The properties of the edge trim 12 may be customized to the specific application and environment of the conduit 18. For instance, the edge trim 12 may be made flame/fire, ballistic, abrasion, impact, solvent, chemical/gas, weather, and/or temperature resistant by selecting the appropriate matrix of materials for the edge trim 12 as will be known to those skilled in the art, such as flourosilicone, nitrile, neoprene, or other elastomers.

The edge trim 12 also may be partially or totally rigidized by forming the edge trim of resin impregnated, fiber reinforced fabrics or otherwise integrating resin impregnated, fiber reinforced fabrics within the edge trim during fabrication. The lip 22 of the edge trim 12 that faces away from the end of the insert 17 may be rigidized to provide stability about the end of the insert and to maintain the bead 24 substantially parallel to the end of the insert. In this situation, the inner surfaces of the edge trim 12 that face the insert 17 may be made of any semi-compressible, damage tolerant, and flexible material, such as an elastomeric material, in order to ensure a tight seal between the insert and the edge trim 12.

The type of reinforcement may be selected for the specific environmental application of the edge trim 12. For example, Nextel™, commercially available from 3M Corporation, polyester, fiberglass, or aramid, such as Kevlar™ commercially available from du Pont de Nemours and Company Corporation, fibers may be added as reinforcement depending upon the desired properties of the edge trim. Furthermore, examples of the resin materials are thermoplastic or thermoset materials. The weave pattern of the fiber reinforcements may also be selected to achieve adaptability in fitting the surface of the conduit 18. For instance, a weave that allows stretch of the edge trim 12 in one direction while stabilizing the edge trim in other directions, known to those skilled in the art as crowfoot weave, may be desirable in applications where one edge trim will accommodate a variety of conduit thicknesses.

Figure 5:
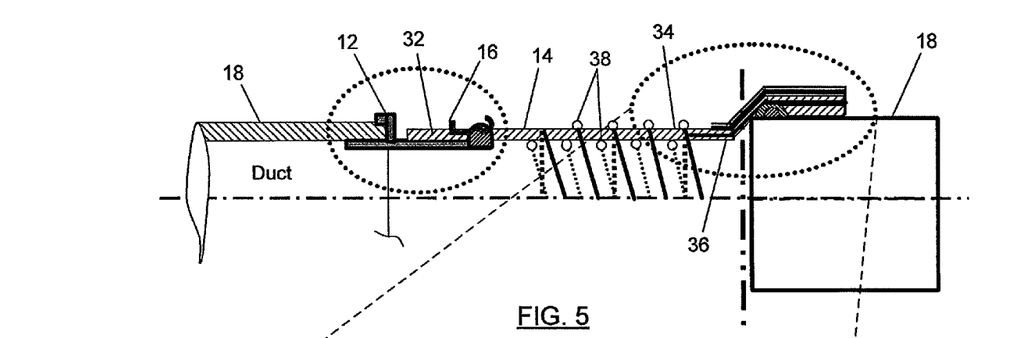
FIG. 5 is a cross-sectional view of a system for joining and sealing conduits according to another embodiment of the present invention.
Figure 5A:
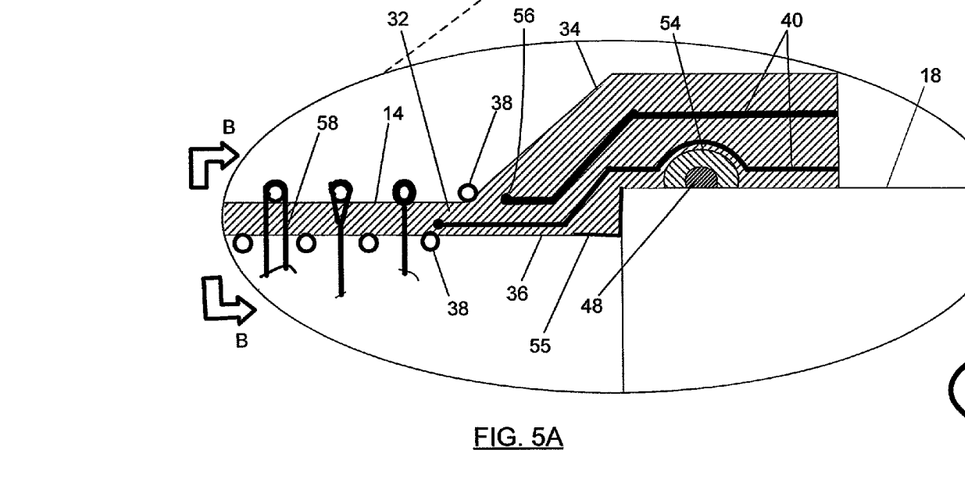
FIG. 5A is an enlarged cross-sectional view of a semi-rigid end of the sleeve shown in FIG. 5.
Figure 5B:
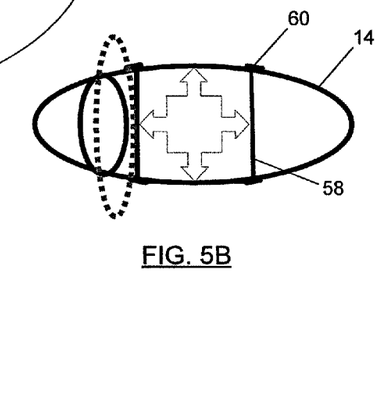
FIG. 5B is a cross-sectional end view of a medial portion of the sleeve of FIG. 5.
Figure 5C:
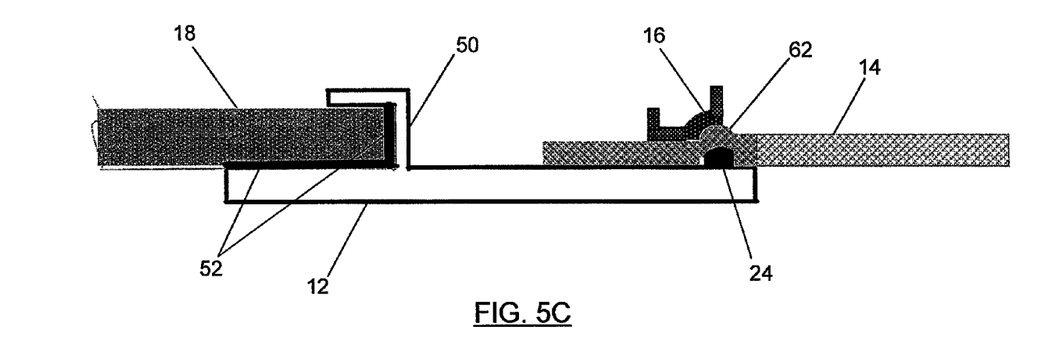
FIG. 5C is an enlarged cross-sectional view of the edge trim and conduit of FIG. 5.

FIGS. 5 and 5C depict an additional embodiment of the present invention where the insert 17 is omitted and the edge trim 12 extends within a portion of the end of the conduit 18 and adjacent to an edge of the conduit. The edge trim 12 also includes a lip 50 that extends about the edge of the end of the conduit 18. The lip 50 could also extend adjacent to the edge of the conduit 18 and further along a portion of the outer surface of the conduit as illustrated in FIG. 5C. The lip 50 is configured to engage the exposed end of the conduit 18 such as to prevent moisture penetration and facilitate a tighter seal thereabout. For example, the lip 50 could include an edge seal 52 comprising an elastomeric material, which is capable of conforming to the interstices of the honeycomb material of the conduit 18.

Figure 4A:
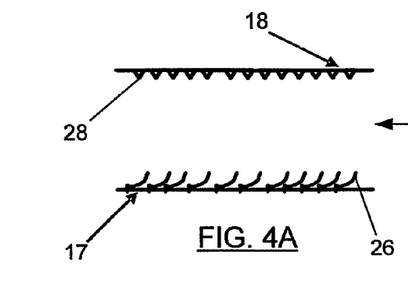
FIG. 4A is enlarged cross-sectional view of the conduit and insert shown in FIG. 4.
Figure 4B:
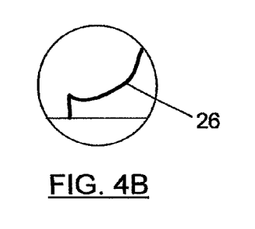
FIG. 4B is an enlarged view of a serration extending from the insert shown in FIG. 4A.

FIG. 4 illustrates the edge trim 12, insert 17, and conduit 18 according to another embodiment of the present invention. In particular, FIG. 4A demonstrates that the outer surface of the insert 17 includes a plurality of serrations 26 that are configured to engage a plurality of serrations 28 extending from the inner surface of the conduit 18. As shown in FIG. 4B, the serrations 26 include arcuate portions that extend angularly from a shorter linear segment. Similarly, the inner surface of the edge trim 12 includes a plurality of serrations 30 that are capable of engaging the serrations 26 extending from the insert 17, as shown in FIG. 4B. The serrations 30 include a similar configuration of the serrations 26 but are inverted such that the short linear segment is positioned away from the inner surface of the edge trim 12.

Figures 4C, 4D:
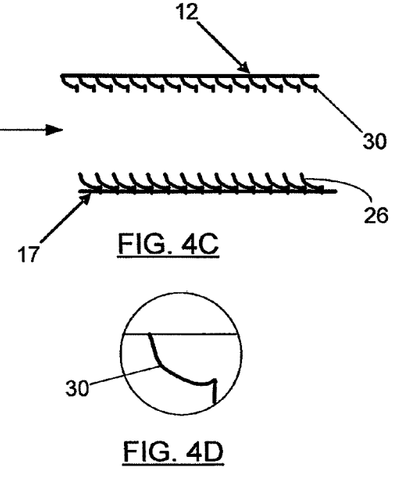
FIG. 4C is enlarged cross-sectional view of the edge trim and insert shown in FIG. 4.
FIG. 4D is an enlarged view of a serration extending from the edge trim shown in FIG. 4C.

It is understood that the configuration of the illustrated serrations 26, 28, and 30 is not meant to be limiting, as the serrations could be various sizes and configurations that provide an interlocking relationship between the engaging surfaces and positively engage one another in response to airflow, "AF" (see FIGS. 4A and 4C) and back pressure within the sleeve 14. For example, the airflow "AF" and back pressure within the sleeve 14 causes the serrations 26 to move in the direction of the airflow "AF" (right to left in FIG. 4A) to engage the serrations 28. Thus, the serrations 26, 28, and 30 engage one another to provide a mechanical engagement therebetween such that bonding (e.g., with an adhesive) between the edge trim 12, insert 17, and conduit 18 is not required. Therefore, the edge trim 12, insert 17, and conduit 18 may be readily assembled and disassembled for maintenance without breaking or otherwise damaging the components. However, the edge trim 12, insert 17, and conduit 18 may be bonded together with any type of compatible adhesive if desired.

The sleeve 14 of the present invention extends between a gap (designated as "A" in FIG. 1) extending between ends of the conduits 18 to be joined. In the embodiment illustrated in FIG. 1 the sleeve 14 joins a duct and an air mixing plenum. The sleeve 14 at least partially surrounds the edge trim 12 on the duct at one end of the sleeve and the air mixing plenum at the opposite end of the sleeve. As explained in further detail below, the edge trim 12 has a bead 24, and the sleeve 14 surrounds or extends over the bead. The sleeve could also define an inwardly extending groove that is configured to conform to the bead 24.

Figure 2:
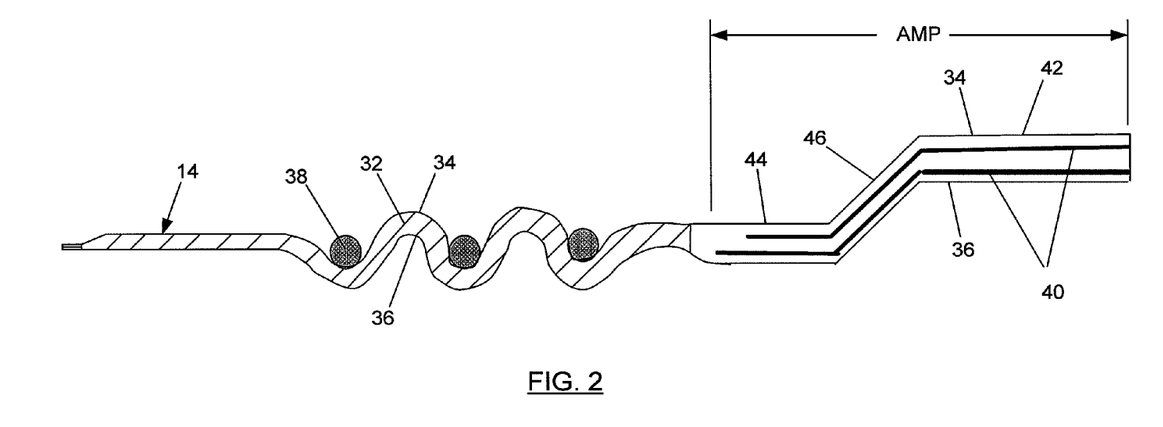
FIG. 2 is a cross-sectional view of the sleeve shown in FIG. 1.

A cross-sectional view of one embodiment of the sleeve 14 of the present invention is shown in FIG. 2. While the sleeve 14 may be constructed in different manners, the sleeve of this embodiment generally includes a core 32, an outer facing 34, and an inner facing 36. The core 32 may be made of any elastomeric or plastic foam depending upon the specific application and/or environment of the conduit 18. For example, the core 32 may be made of self-skinning cellular silicone foam or rubber in applications where controlled compression, rebound resilience, heat resistance, oxidation resistance, and ozone attach resistance is desirable.

To enhance the fluid resistance and friction between the sleeve 14, the edge trim 12 and, in some embodiments, the retaining element 16, an outer facing 34 and inner facing 36 may be bonded to the core 32. The facings 34, 36 may be made of any suitable elastomer coated on a suitable fabric, the specific properties of which are chosen depending upon the application and environment of the conduit 18. For example, both the outer and inner facings 34, 36 may be made of an elastomer-coated fabric, such as a fabric coated with a flouroelastomer, that provides a high coefficient of friction between the sleeve 14 and the components positioned adjacent to the sleeve 14. Alternatively, the inner facing 36 may be made of an elastomer-coated fabric with a high coefficient of friction, in order to hold the sleeve 14 on the conduit 18, edge trim 12, and/or insert 17, while the outer facing 34 may be at least partially made of a low friction material, such as Teflon™ commercially available from du Pont de Nemours and Company Corporation, in order to at least initially slide the retaining element 16 over the sleeve without difficulty.

The uncured elastomers coated on a fabric may be rubber, rubber-based, or silicone material. For a high coefficient of friction, the elastomers may be coated on a fiberglass or other suitable fabric. One example of an elastomer-coated fabric having a relatively high coefficient of friction, particularly when mated with substrate materials, is the fluoroelastomer Viton™, commercially available from du Pont de Nemours and Company Corporation. For a material with a lower coefficient of friction, the elastomers may be coated on a polyester, aramid, such as Kevlar™ commercially available from du Pont de Nemours and Company Corporation, Nextel™ commercially available from 3M Corporation, or any other suitable fabric for the specific application. In addition, to obtain the desired amount of stretch in the layers, the fibers in the fabric may be oriented from a bias position (more stretch) to a non-bias position (less stretch). Bias fabric is made of wrap and fill fibers generally at a 45 degree angle to the length of the fabric, which enables the fabric to stretch in essentially any direction. Non-bias fabric is made from wrap and fill fibers in which the wrap fibers are generally parallel to the length of the fabric and perpendicular to the fill fibers. Non-bias fabric stretches essentially only in the wrap and fill directions, but non-bias fabric may be cut diagonally to the length of the fabric to produce a fabric with bias characteristics. For example, to prevent deflection of the sleeve 14 between the conduits 18 due to internal pressure during operation, the outer and/or inner facing 34, 36 may be made of elastomers coated on a non-bias material, such that the outer layer prevents the sleeve from stretching, and, thus, prevents deflection.

FIG. 2 also illustrates that the outer and inner facings 34, 36, may be longer than the core 32 at one or both ends of the sleeve 14, such that the facings may completely surround the core 32. The regions of the outer and inner facings 34, 36, that are longer than the core 32 may be utilized in installation of the sleeve 14 as an area to grasp and pull the sleeve over the edge trim 12, conduit 18, and/or insert 17. In general, the core 32 is configured to extend at least along a medial portion of the sleeve 14, although the core could extend the entire length of the sleeve or any desired length within the sleeve.

Furthermore, FIGS. 1 and 2 demonstrate that the sleeve 14 also includes a helix 38 extending circumferentially about a medial portion of the sleeve. The helix 38 may be incorporated within the sleeve 14 or about the exterior of the sleeve. For instance, the helix 38 may be embedded within the core 32 or between the core and the facings 34, 36. The helix 38 diameter, coil pitch, and material may be customized to achieve a desired flexibility without creating stress at the sleeve joints during operational conditions and without internal pressure causing the sleeve 14 to balloon. The helix may also prevent deflection of the sleeve 14 and create friction against the edge of the retaining element 16. Moreover, FIG. 5 demonstrates that more than one helix 38 may be employed, such as a helix coiled about the inner and outer surfaces of the sleeve 14. For a further discussion of a helix that could be incorporated with the sleeve 14, see U.S. Pat. Nos. 6,830,076 and 6,000,435, which are both assigned to the present assignee and incorporated herein by reference.

According to a further aspect of the apparatus 10, the sleeve 14 includes a semi-rigid end that is configured to overlie a portion of the air mixing plenum (designated as "AMP" in FIG. 2). The semi-rigid end is generally less flexible than the remaining portion of the sleeve. In particular, the semi-rigid end includes a plurality of layers of semi-rigid material 40 that are positioned between layers of facing 34, 36. The semi-rigid material 40 could also be embedded within, or positioned adjacent to, the core 32 if the core is configured to extend within the semi-flexible end of the sleeve 14. The semi-rigid end is generally dog-boned in configuration. In particular, the semi-rigid end includes a planar portion 42 adjacent to the air mixing plenum, a planar portion 44 extending proximate to the medial portion of the sleeve, and an angular portion 46 extending therebetween. Each layer of semi-rigid material 40 may comprise pre-impregnated fiberglass cloth.

Figure 3:
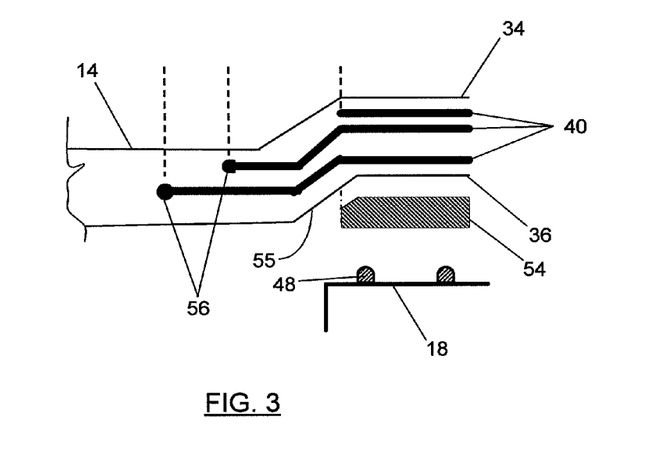
FIG. 3 is an enlarged cross-sectional view of a semi-rigid end of a sleeve according to another embodiment of the present invention.

In addition, FIGS. 2 and 5A show that one layer of the semi-rigid material 40 is longer than the other layer. Similarly, FIG. 3 illustrates three layers of semi-rigid material 40, where each layer increases progressively in length between the outer and inner facings 34, 36. Because there are more layers of semi-rigid material 40 proximate to the air mixing plenum, the rigidity of the semi-rigid end decreases from the end of the sleeve 14 towards the medial portion of the sleeve. In addition, the termination of the layers of semi-rigid material 40 creates "steps" for progressively absorbing bending moments and forces that may prevent uprooting of the sleeve 14 interface at the air mixing plenum. Thus, the semi-rigid end is configured as a "hinge" to aid in distributing loads away from the attachment of the sleeve 14 and air mixing plenum, as well as limiting the shear factor between the sleeve and the air mixing plenum. FIGS. 3 and 5A also demonstrate that one or more of the ends of layers of semi-rigid material 40 may include rounded edges 56 or a ball defined thereon or attached thereto. The rounded edge 56 could be separately attached to the end of the semi-rigid material 40 such as a thermoplastic ball having a groove defined therein that is capable of engaging the end of the semi-rigid material. Alternatively, the rounded edge 56 could be formed with the semi-rigid material 40, such as by manipulating the end of the semi-rigid material into a rounded configuration. The rounded edges 56 form a bearing surface on the facings 34, 36 and/or core 32 such that the layers of semi-rigid material are capable of pivoting as the sleeve 14 and/or air mixing plenum is loaded.

The semi-rigid end also includes a layer of elastomeric material 54 that is applied to a portion of the inner facing 36, as shown in FIGS. 3 and 5A. For instance, the elastomeric material 54 could be a silicone rubber material. The elastomeric material 54 facilitates engagement of the semi-rigid end and the air mixing plenum with a "suction" type engagement. More specifically, the elastomeric material 54 is capable of conforming to a bead 48 extending outwardly from the outer surface of the air mixing plenum. For example, the longest layer of semi-rigid material 40 may include an inwardly extending ridge that conforms to the bead 48 of the air mixing plenum and the elastomeric material 54. Thus, the layers of semi-rigid material 40 exert pressure on the underlying elastomeric material 54 for positive sealing with the bead 48. In particular, the pressure against the bead 48 compresses and densifies the elastomeric material 54 to add hardness, pressure, and mechanical engagement.

FIGS. 3 and 5A demonstrate that the termination 55 of the sleeve 14 at the interface with the air mixing plenum may be of various configurations. For instance, FIG. 1 demonstrates that the sleeve 14, including the layers of semi-rigid material 40, could be tapered at the termination 55 with the air mixing plenum. Alternatively, FIG. 5A illustrates that the sleeve 14 extends adjacent to the air mixing plenum at the termination 55 to define a right angle thereto, which may absorb cantilever loads caused by misalignments of the conduit 18 and the air mixing plenum and may prevent uprooting (i.e., opening) of the sleeve. The termination 55 could also include a rigid material (e.g., L-shaped) positioned within or adjacent to the sleeve 14 to limit transferring of misaligned loads, as shown in FIG. 5A.

It is understood that the illustrated semi-rigid end of the sleeve 14 is not meant to be limiting, as the semi-rigid end may be various sizes and configurations. For example, the semi-rigid end may include one or more layers of pre-impregnated fiberglass cloth. In addition, the semi-rigid end may include one or more layers of semi-rigid material 40 that provides additional stiffness to the sleeve proximate to the air mixing plenum, such as a carbon fiber, polyester glass, epoxy glass, polymeric, or thermoplastic glass material. Moreover, although the semi-rigid end of the sleeve 14 is shown as having a dog-bone configuration, the sleeve could be a constant diameter or various other diameters depending on the specifications required for joining and sealing conduits 18. Thus, each layer of semi-rigid material 40 may be generally planar within the sleeve 14 or other configurations. Furthermore, the longest layer of semi-rigid material 40 could be positioned proximate to the external surface or internal surface of the sleeve 14.

FIGS. 5A and 5B illustrate a further aspect of the present invention wherein tension ties 58 are utilized to control the deflection of the sleeve 14 (as indicated by the arrows shown in FIG. 5B). The tension ties 58 are directly attached to the helix 38 and extend generally perpendicular to the longitudinal axis of the sleeve. The tension ties 58 typically attach externally to the sleeve and extend through the sleeve 14. As such, various techniques, such as a seal ply 60 or an adhesive, may be utilized to reduce leakage out of the sleeve 14. The seal ply 60 may also be necessary to support the sleeve 14 due to negative pressure within the sleeve. In addition, the sleeve 14 is generally oval in cross section, and the tension ties 58 restrict outward deflection of the sleeve to limit distortion at the sleeve/conduit interface. Thus, tension ties 58 may be necessary in higher pressure applications. The tension ties 58 are typically positioned such that the spacing or pitch "P" between each tension tie along the longitudinal axis of the sleeve 14 (see FIG. 6) is equal to or less than the diameter or minor axis of the sleeve or conduit 18.

Figure 6:
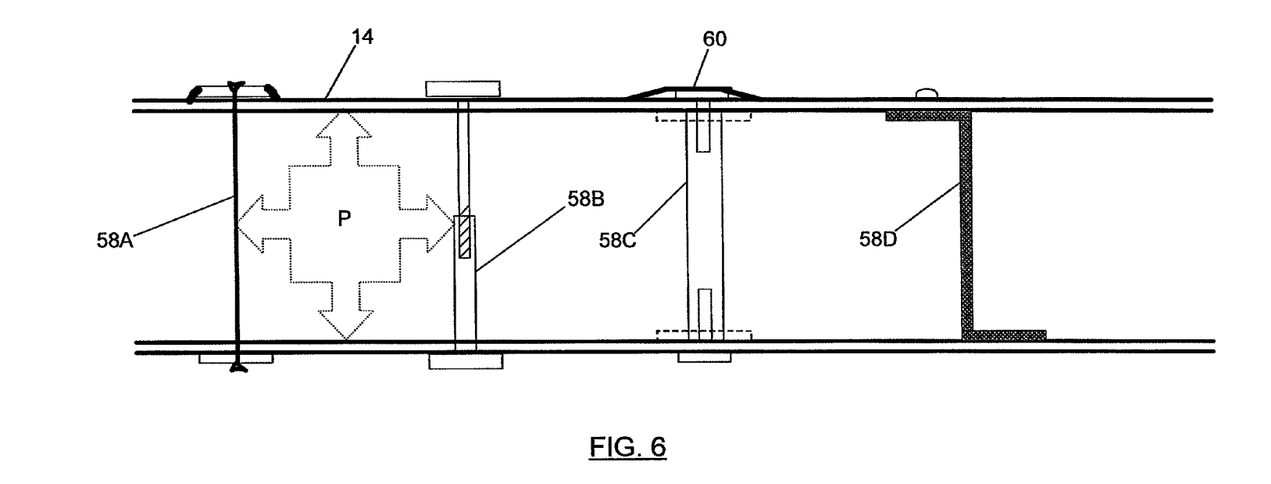
FIG. 6 illustrates various cross sections of tension ties according to additional embodiments of the present invention.

FIG. 6 illustrates that various configurations of tension ties 58 may be employed in additional embodiments of the present invention. For instance, the tension tie 58A may be a cord tied at opposite ends and attached to the sleeve 14. The cord could be various materials, such as Kevlar®, fiberglass, nylon, polyester, or wire, and tied to the external surface of the sleeve 14 with a supportive material, such as metal, plastic, or other similar material to prevent tearing of the sleeve. Moreover, the tension tie 58B could be a rod/bolt or tube/nut combination. FIG. 6 shows that the tension tie 58B may be a threaded male component that mates with a female component. In addition, the tension tie 58C could be a rod/bolt/tube having opposite female ends that are threaded and capable of mating with male bolts from the external surface of the sleeve 14. In addition, FIG. 6 shows that the ends of the female member may include heads positioned adjacent to the internal surface of the sleeve 14 for additional support such that the tension tie 58C accounts for both positive and negative pressure within the sleeve. FIG. 6 also illustrates that the tension tie 58D may be a partition or web that is positioned internally within the sleeve 14 and attached internally, such as via adhesives, and/or externally, such as with fasteners. The tension tie 58D may be various configurations such as Z-shaped, I-shaped, or U-shaped.

The retaining element 16 shown in FIGS. 1 and 1A is configured to surround a portion of the sleeve 14, edge trim 12, and insert 17 mounted to the conduit 18 in order to hold the sleeve in position with respect to the edge trim. The shape of the retaining element 16 may be customized to match the shape of the edge trim 12 and partially compress the sleeve 14. For example, the retaining element may include an inwardly extending ridge 62 that conforms to the bead 24 extending outwardly from the edge trim 12.

The retaining element 16 may be made of a rigid material, such that the retaining element 16 firmly and uniformly engages the sleeve 14, edge trim 12, and insert 17 to provide a seal about the end of the conduit 18. The rigid characteristic of the retaining element 16 also prevents the deflection of the conduit 18 due to internal pressure in the conduit 18, at least near the end of the conduit 18. The anti-deflection feature of the retaining element 16 also adds to the leak-proof nature of the seal created by the retaining element 16 and the other components joining the conduits 18. The retaining element 16 exerts a force on the conduit 18 and the deflection of the conduit 18 exerts an oppositely directed force on the retaining element 16 and the other components, providing a tight seal about the end of the conduit. In addition, FIGS. 5 and 5C depict an alternative embodiment wherein the retaining element 16 engages the edge trim 12 and sleeve 14 such that an insert 17 is not required.

The retaining element 16 may be made by a process and from materials, chosen by assessing a variety of factors, such as weight requirements, cost of material, cost of the tools, and quantity. For example, the retaining element 16 may be made of a composite material, fabricated by laminating multiple plies of resin pre-impregnated fiberglass cloth on a metal tool, i.e., a mandrel, defining the shape of the retaining element and oven cured under heat and pressure. Once the retaining element 16 is cured, it may be trimmed to meet the specific design dimensions of the application. Other examples of processes and materials for making the retaining element include injection-molded thermoplastics, compression molded thermoset plastics, and machined, cast and rolled formed metals.

If the sleeve 14 is made of a compressible material, as discussed hereinabove, then the retaining element 16 is preferably sized to be smaller than the nominal, uncompressed size of the sleeve, but once the sleeve is mounted upon the conduit 18, equal to or slightly larger than the resulting size if the sleeve were fully compressed. As such, the retaining element 16 generally compresses the sleeve 14 as it is moved toward the end of the conduit 18. Therefore, when the retaining element is in place near the end of the conduit 18, the sleeve 14 may be compressed under at least a portion of the retaining element 16 adjacent to the ridge 62. The remaining portions of the sleeve 14 are typically uncompressed such that the uncompressed portion or portions of the sleeve 14 may at least partially restrain or discourage the retaining element 16 from moving, at least in the direction away from the end of the conduit 18, once the retaining element 16 is in place.

The retaining element 16 may also include at least one outwardly extending support 64. The support 64 prevents or further limits outward deflection of the retaining element 16 to ensure a tight seal. As shown in FIGS. 1A and 5C, the support 64 could be various configurations, such as a hook, for adding stiffness to account for deflection of the system.

It is understood that the discussion above pertaining to the edge trim 12, sleeve 14, and retaining element 16 is not meant to be limiting. For example, the materials and configurations of the edge trim 12, sleeve 14, and retaining element 16 may be modified for a particular application for joining and sealing conduits. For an exemplary discussion of alternative configurations for the edge trim 12, sleeve 14, and retaining element, see U.S. Patent Application Publication No. 20060006650, which is assigned to the present assignee and incorporated herein by reference.

Figure 7:
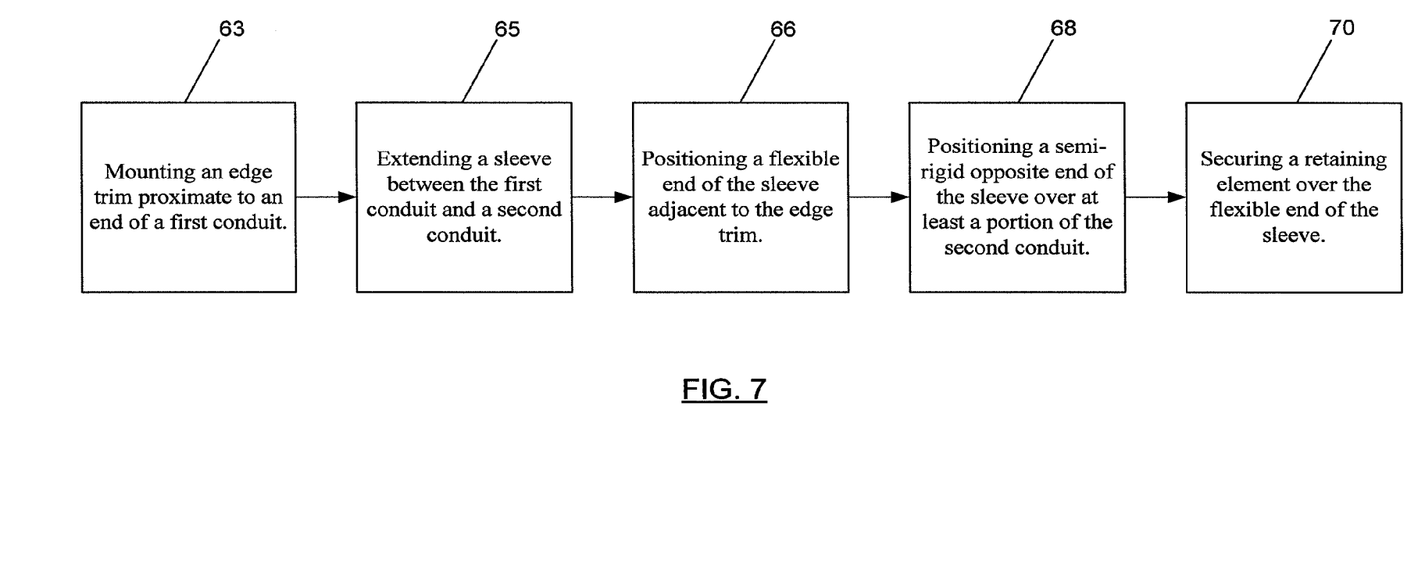
FIG. 7 is a flowchart depicting a method for sealing and joining conduits according to one embodiment of the present invention.

FIG. 7 depicts an exemplary method for joining and sealing conduits (e.g., a duct and air mixing plenum) according to one embodiment of the present invention. To join a conduit and an air mixing plenum, the edge trim 12 is mounted upon an end of a conduit 18 (block 63). According to one embodiment, an insert 17 could also be mounted to the end of the conduit 18, while the insert is positioned adjacent to the edge trim 12. Each of the edge trim 14, insert 17, and conduit 18 include serrations 26, 28, 30 that provide a mechanical engagement that typically eliminates the need for bonding the edge trim, insert, and/or conduit together. The sleeve 14 may then be extended between the conduit 18 and the air mixing plenum (block 65), and a flexible end of the sleeve is positioned to at least partially cover the end of the edge trim 12 (block 66), while a semi-rigid end of the sleeve is positioned to at least partially overlie an end of the air mixing plenum (block 68). If the edge trim 12 has a bead 24, then one end of the sleeve 14 may cover the bead, and the air mixing plenum may also have a bead 48 that conforms to the semi-rigid end of the sleeve. At the semi-rigid end of the sleeve 14, an elastomeric material 54 may be employed to facilitate the engagement of the sleeve and the bead 48 of the air mixing plenum. The retaining element 16 is then slid over the sleeve 14 toward the end of the conduit 18 so as to sandwich the sleeve 14 between the retaining element 16 and the edge trim 12 (block 70). If the edge trim 12 has a bead 24, then the retaining element 16 is slid over the sleeve 14 toward the bead, such that a portion of the sleeve is sandwiched between the retaining element and the bead.

Embodiments of the present invention may provide several advantages. For example, the apparatus, system, and method of one embodiment of the present invention may provide an economical and effective way to join and seal conduits. The apparatus of the present invention creates a seal about the ends of the conduits through a combination of components designed to work together by their shape and their material properties. Thus, size differences, gap variations, and misalignment of the conduits may be accounted for to provide an effective seal between the conduits. In addition, the properties and characteristics of the components may utilize the inherent nature of the conduits to deflect during operation to create an even stronger seal, unlike the conventional sealing methods in which deflection of the conduits typically causes a break in the seal and leakage of the elements carried by the conduits. The apparatus for joining and sealing conduits of one embodiment of the present invention may be easier to mount upon conduits than the conventional system because the components are pre-made and designed to fit snuggly about the conduits without adhesive, which may reduce the time and effort that must be expended by an installer. Furthermore, the apparatus and method of one embodiment of the present invention provide components to join and seal conduits that may be removed and reinstalled without damaging the conduit or the components, which may decrease the cost and time involved when removing conduits during maintenance checks or otherwise.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sleeve for joining and sealing conduits comprising:
a core layer having an inner surface and an outer surface;
a first layer and a second layer of facing bonded to at least a portion of respective inner and outer surfaces of the core layer; and
a plurality of independent and spaced apart layers of semi-rigid material positioned between the first and second layers of facing and proximate to a first end of the sleeve such that the layers of semi-rigid material are not in direct contact with one another and the portion of the sleeve comprising the semi-rigid material is less flexible than the remaining portion of the sleeve.

2. The sleeve of claim 1, further comprising a layer of elastomeric material bonded to the first layer of facing along the portion of the sleeve comprising the layer of semi-rigid material.

3. The sleeve of claim 2, wherein the layer of elastomeric material comprises an inwardly extending ridge, and wherein the ridge is configured to conform to a bead extending outwardly from an air mixing plenum.

4. The sleeve of claim 1, further comprising at least one helix positioned along a medial portion of the sleeve such that the helix does not overlie the portion of the sleeve comprising the layers of semi-rigid material.

5. The sleeve of claim 4, wherein the at least one helix is positioned adjacent to or within at least one of the first layer of facing, the second layer of facing, and the core layer.

6. The sleeve of claim 1, wherein the core layer comprises an elastomeric or a foam material.

7. The sleeve of claim 1, where the first and second layers of facing comprises an elastomeric material coated on a layer of fabric.

8. The sleeve of claim 1, wherein each of the plurality of layers of semi-rigid material comprises a pre-impregnated composite material.

9. The sleeve of claim 1, wherein each of the plurality of layers of semi-rigid material is a different length.

10. The sleeve of claim 1, wherein at least one of the plurality of layers of semi-rigid material is embedded within or positioned adjacent to the core layer.

11. The sleeve of claim 1, wherein at least one of the plurality of layers of semi-rigid material comprises a rounded end that is capable of pivoting within at least one of the first and second layers of facing and the core layer.

12. An apparatus for joining and sealing conduits comprising:
an edge trim positioned proximate to an end of a first conduit;
a sleeve positioned between the first conduit and a second conduit, wherein the sleeve comprises:
a flexible end positioned adjacent to the edge trim such that a portion of the flexible end of the sleeve overlies at least a portion of the edge trim;
a semi-rigid end opposite the flexible end and positioned over at least a portion of the second conduit, wherein the semi-rigid end of the sleeve comprises a plurality of independent and spaced apart layers of semi-rigid material such that the layers of semi-rigid material are not in direct contact with one another, and wherein the semi-rigid end is less flexible than the flexible end of the sleeve; and
a flexible medial portion extending between the flexible end and the semi-rigid end; and
a retaining element configured to be secured over the flexible end of the sleeve such that a portion of the flexible end of the sleeve is sandwiched between the retaining element and the edge trim.

13. The apparatus of claim 12, further comprising a layer of elastomeric material bonded proximate to the semi-rigid end of the sleeve.

14. The apparatus of claim 13, wherein the layer of elastomeric material comprises an inwardly extending ridge, and wherein the ridge is configured to conform to a bead extending outwardly from the second conduit.

15. The apparatus of claim 12, wherein the retaining element comprises an inwardly extending ridge.

16. The apparatus of claim 15, wherein the edge trim comprises an outwardly extending bead, and wherein at least a portion of the flexible end of the sleeve is configured to be sandwiched between the bead and the inwardly extending ridge.

17. The apparatus of claim 12, further comprising at least one helix positioned along the medial portion of the sleeve.

18. The apparatus of claim 12, wherein each of the layers of semi-rigid material is a different length.

19. The apparatus of claim 12, wherein the semi-rigid end of the sleeve has a larger outer diameter than both the flexible end and the medial portion.

20. The apparatus of claim 12, wherein the edge trim is positioned adjacent to at least a portion of the end of the first conduit, and wherein at least a portion of the edge trim comprises an elastomeric material.

21. A system for joining and sealing a conduit and an air mixing plenum comprising:
   a conduit;
   an air mixing plenum spaced away from the conduit to define a gap therebetween;
   a sleeve positioned within the gap between the conduit and the air mixing plenum and comprising a flexible end and a semi-rigid end opposite the flexible end, wherein the flexible end is positioned over at least a portion of the conduit, wherein the semi-rigid end is positioned over at least a portion of the air mixing plenum such that the conduit and air mixing plenum are in fluid communication with one another, wherein the semi-rigid end of the sleeve comprises a plurality of independent and spaced apart layers of semi-rigid material such that the layers of semi-rigid material are not in direct contact with one another, and wherein the semi-rigid end is less flexible than the flexible end of the sleeve.

22. The system of claim 21, further comprising an edge trim positioned proximate to an end of the conduit.

23. The system of claim 22, further comprising a retaining element configured to be secured over the flexible end of the sleeve such that a portion of the flexible end of the sleeve is sandwiched between the retaining element and the edge trim.

24. An apparatus for joining and sealing conduits comprising:
   an edge trim positioned proximate to an end of a first conduit;
   a sleeve positioned between the first conduit and a second conduit, wherein the sleeve comprises:
      a flexible end positioned adjacent to the edge trim such that a portion of the flexible end of the sleeve overlies at least a portion of the edge trim;
      a semi-rigid end opposite the flexible end and positioned over at least a portion of the second conduit, wherein the semi-rigid end is less flexible than the flexible end of the sleeve; and
      a flexible medial portion extending between the flexible end and the semi-rigid end;
   at least one helix positioned along the medial portion of the sleeve; and
   a retaining element configured to be secured over the flexible end of the sleeve such that a portion of the flexible end of the sleeve is sandwiched between the retaining element and the edge trim.

* * * * *